(12) United States Patent
Niki

(10) Patent No.: US 7,230,691 B2
(45) Date of Patent: Jun. 12, 2007

(54) PHOTOMETER

(75) Inventor: Shoji Niki, Miyagi (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 10/567,446

(22) PCT Filed: Aug. 4, 2004

(86) PCT No.: PCT/JP2004/011493

§ 371 (c)(1),
(2), (4) Date: Apr. 3, 2006

(87) PCT Pub. No.: WO2005/015139

PCT Pub. Date: Feb. 17, 2005

(65) Prior Publication Data

US 2006/0203228 A1    Sep. 14, 2006

(30) Foreign Application Priority Data

Aug. 8, 2003    (JP)    ............................. 2003-290787

(51) Int. Cl.
G01N 21/00    (2006.01)
(52) U.S. Cl. .................................... 356/73.1
(58) Field of Classification Search .................... None
See application file for complete search history.

(56) References Cited

U.S. PATENT DOCUMENTS 4,138,645 A * 2/1979 Parato ..................... 455/226.1
6,104,477 A * 8/2000 Yoshida et al. ............... 356/73
6,646,727 B2 * 11/2003 Saleh et al. ................ 356/73.1
6,727,490 B2 * 4/2004 Medard et al. ........ 250/227.11

FOREIGN PATENT DOCUMENTS

| JP | 10-307078 | 11/1998 |
| JP | 2001-230475 | 8/2001 |
| JP | 2002-340673 | 11/2002 |

OTHER PUBLICATIONS

English Language Abstract of JP 2002-340673.
English Language Abstract of JP 10-307078.
English Language Abstract of JP 2001-230475.

* cited by examiner

*Primary Examiner*—Tu T. Nguyen
(74) *Attorney, Agent, or Firm*—Greenblum & Bernstein, P.L.C.

(57) ABSTRACT

A photometer includes a spectrometer that extracts a component of a predetermined wavelength band from incident light, a coupler that branches the predetermined wavelength band component into a first direction and a second direction, an optical switch that includes a first input terminal, a second input terminal, a first output terminal, and a second output terminal, an optical amplifier that receives light from the second output terminal and outputs amplified light, which is obtained by amplifying the light, to an incident light receiving section of the spectrometer, and a photodetector that is connected to the first output terminal and detects light.

10 Claims, 7 Drawing Sheets

PHOTOMETER

TECHNICAL FIELD

The present invention relates to a measurement of wavelength characteristics and an optical spectrum of a device under test such as an optical fiber.

BACKGROUND ART

A spectrum analyzer has conventionally been used to measure an optical spectrum. The spectrum analyzer includes spectrometers and photodetectors (refer to a patent document 1 (Japanese Laid-Open Patent Publication (Kokai) No. 2002-340673 (ABSTRACT)), for example).

Moreover, a wavelength characteristics measuring unit which measures wavelength characteristics of a device under test such as an optical fiber includes a light source which makes light incident on a device under test, and a photodetector which detects the light which has transmitted through the device under test.

It may be necessary to successively measure the wavelength characteristics and the optical spectrum of a device under test. On this occasion, the wavelength characteristics measuring unit is first used, and the spectrum analyzer is then used.

However, when the wavelength characteristics measuring unit is used, the spectrometer and the photodetector of the spectrum analyzer cannot be used. When the spectrum analyzer is used, the light source and the photodetector of the wavelength characteristics measuring unit cannot be used.

In view of the foregoing problem, an object of the present invention is to efficiently use members of the spectrum analyzer and the wavelength characteristics measuring unit. Namely, the object is to provide a device with the minimum configuration which can measure the wavelength characteristics and the optical spectral characteristics.

DISCLOSURE OF INVENTION

According to an aspect of the present invention, a photometer includes: an wavelength-band-component extracting unit that extracts a component of a predetermined wavelength band from incident light; a branching unit that branches the predetermined wavelength band component into a first direction and a second direction; an optical connecting unit that includes a first input terminal, a second input terminal, a first output terminal, and a second output terminal, the first input terminal being connected to one end of an device under test, and the second input terminal being connected to a side in the first direction of the branching unit; an optical amplifying unit that receives light from the second output terminal, and outputs amplified light, which is obtained by amplifying the light, to an incident light receiving section of the wavelength-band-component extracting unit; and a photodetecting unit that is connected to the first output terminal, and detects light, wherein: the other end of the device under test is connected to a side in the second direction of the branching unit; and the optical connecting unit (1) connects between the first input terminal and the first output terminal, and between the second input terminal and the second output terminal, or (2) connects between the first input terminal and the second output terminal, and between the second input terminal and the first output terminal.

According to the thus constructed photometer, an wavelength-band-component extracting unit extracts a component of a predetermined wavelength band from incident light. A branching unit branches the predetermined wavelength band component into a first direction and a second direction. An optical connecting unit includes a first input terminal, a second input terminal, a first output terminal, and a second output terminal; and the first input terminal is connected to one end of an device under test, and the second input terminal is connected to a side in the first direction of the branching unit. An optical amplifying unit receives light from the second output terminal, and outputs amplified light, which is obtained by amplifying the light, to an incident light receiving section of the wavelength-band-component extracting unit. A photodetecting unit is connected to the first output terminal, and detects light.

Further, the other end of the device under test is connected to a side in the second direction of the branching unit. Furthermore, the optical connecting unit (1) connects between the first input terminal and the first output terminal, and between the second input terminal and the second output terminal, or (2) connects between the first input terminal and the second output terminal, and between the second input terminal and the first output terminal.

According to the thus constructed photometer, the optical amplifying unit may be a fiber amplifier or a semiconductor optical amplifier.

According to the thus constructed photometer, the predetermine wavelength band of the wavelength-band-component extracting unit may be variable.

According to the thus constructed photometer, the device under test may be an optical fiber or a device which transmits light beam.

According to the thus constructed photometer, there may exist a plurality of the wavelength-band-component extracting unit respectively having a predetermined wavelength band to be extracted differing from each other; and there may exist a plurality of the photodetecting unit respectively having a wavelength band of light to be detected corresponding to the predetermined wavelength band.

BEST MODE FOR CARRYING OUT THE INVENTION

A description will now be given of an embodiment of the present invention with reference to drawings.

First Embodiment

Figure 1:
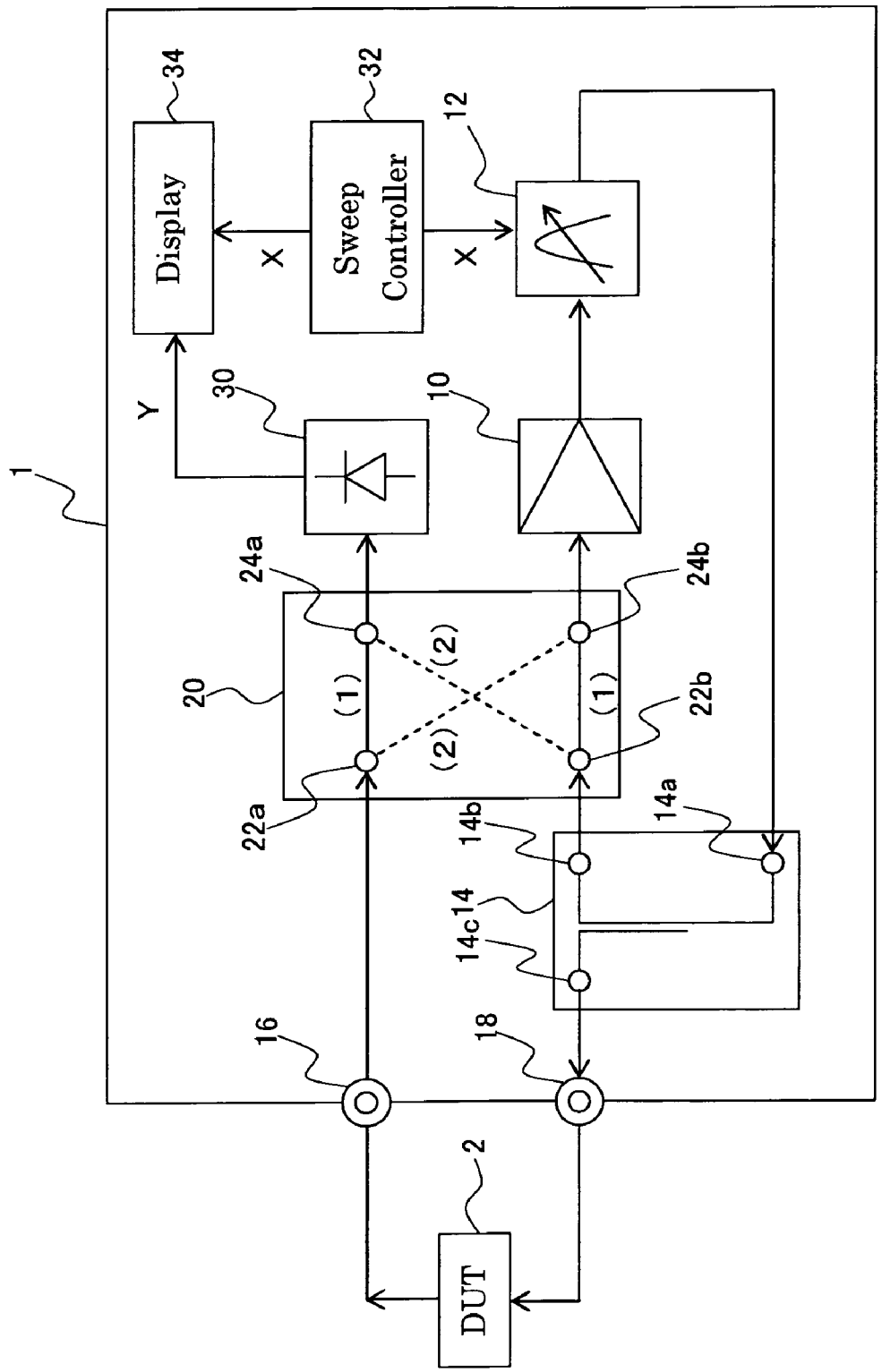
FIG. 1 is a block diagram showing a configuration of a photometer 1 according to a first embodiment of the present invention.

FIG. 1 is a block diagram showing a configuration of a photometer 1 according to a first embodiment of the present invention. The photometer 1 is connected to a device under test (DUT) 2. Although the DUT 2 is preferably an optical fiber, the DUT 2 may be a device which transmits a light beam.

The photometer 1 is provided with an optical amplifier (optical amplifying means) 10, a spectrometer (wavelength-band-component extracting means) 12, a coupler (branching means) 14, an optical input terminal 16, an optical output terminal 18, an optical witch (optical connecting means) 20, a photodetecting section 30, a sweep controller 32, and a display 34.

The optical amplifier (optical amplifying means) 10 amplifies incident light. The optical amplifier 10 may be a fiber amplifier such as an EDFA (erbium doped fiber amplifier) or a semiconductor optical amplifier. The light output from the optical amplifier 10 is referred to as amplified light.

The spectrometer (wavelength-band-component extracting means) 12 extracts a component in a predetermined wavelength band from the amplified light output from the optical amplifier 10. It should be noted that the predetermined wavelength band can be changed by the sweep controller 32. Namely, the predetermined wavelength band can be swept.

The coupler (branching means) 14 includes an input terminal 14a, and output terminals 14b and 14c. The coupler 14 branches light received by the input terminal 14a into the output terminals 14b and 14c. The input terminal 14a receives the predetermined wavelength band component output from the spectrometer 12. The predetermined wavelength band component is thus output to the output terminals 14b and 14c. The output terminal (first direction side) 14b is connected to a second input terminal 22b of the optical switch 20, and the output terminal (second direction side) 14c is connected to the optical output terminal 18.

The optical input terminal 16 is connected to one end of the DUT 2, and is used to receive light emerging from the DUT 2. The optical output terminal 18 is connected to the other end of the DUT 2, and is used to make the light incident on the DUT 2.

The optical switch (optical connecting means) 20 is a DPDT (double ports double throws) type switch. The optical switch 20 includes a first input terminal 22a, a second input terminal 22b, a first output terminal 24a, and a second output terminal 24b.

The first input terminal 22a and the second input terminal 22b are terminals used to receive light. The first input terminal 22a is connected to the one end of the DUT 2 via the optical input terminal 16. The second input terminal 22b is connected to the output terminal 14b of the coupler 14.

The first output terminal 24a and the second output terminal 24b are terminals used to output light. The first output terminal 24a is connected to the photodetecting section 30. The second output terminal 24b is connected to an input side of the optical amplifier 10. It can be considered that the second output terminal 24b is connected to an input side (incident light receiving section) of the spectrometer 12 via the optical amplifier 10.

It should be noted that the optical switch 20: (1) connects between the second input terminal 22b and the second output terminal 24b, and simultaneously between the first input terminal 22a and the first output terminal 24a, or (2) connects between the second input terminal 22b and the first output terminal 24a, and simultaneously between the first input terminal 22a and the second output terminal 24b.

If the second input terminal 22b and the second output terminal 24b are connected with each other, the output terminal 14b of the coupler 14 and the input side of the optical amplifier 10 are to be connected with each other. If the first input terminal 22a and the first output terminal 24a are connected with each other, the one end of the DUT 2 and the photodetecting section 30 are to be connected with each other.

On the other hand, if the second input terminal 22b and the first output terminal 24a are connected with each other, the output terminal 14b of the coupler 14 and the photodetecting section 30 are to be connected with each other. If the first input terminal 22a and the second output terminal 24b are connected with each other, the one end of the DUT 2 and the input side of the optical amplifier 10 are to be connected with each other.

The photodetecting section 30 detects the light received from the first output terminal 24a. Specifically, the photodetecting section 30 converts the received light into an electrical signal.

The sweep controller 32 sweeps the predetermined wavelength band of the spectrometer 12. It should be noted that the predetermined wavelength band is also transmitted to the display 34.

The display 34 shows the predetermined wavelength band determined by the sweep controller 32 upon the X axis (horizontal axis), and the electric signal output by the photodetecting section 30 upon the Y axis (vertical axis).

A description will now be given of an operation of the photometer 1 according to the first embodiment with reference to FIGS. 2 and 3.

Figure 2:
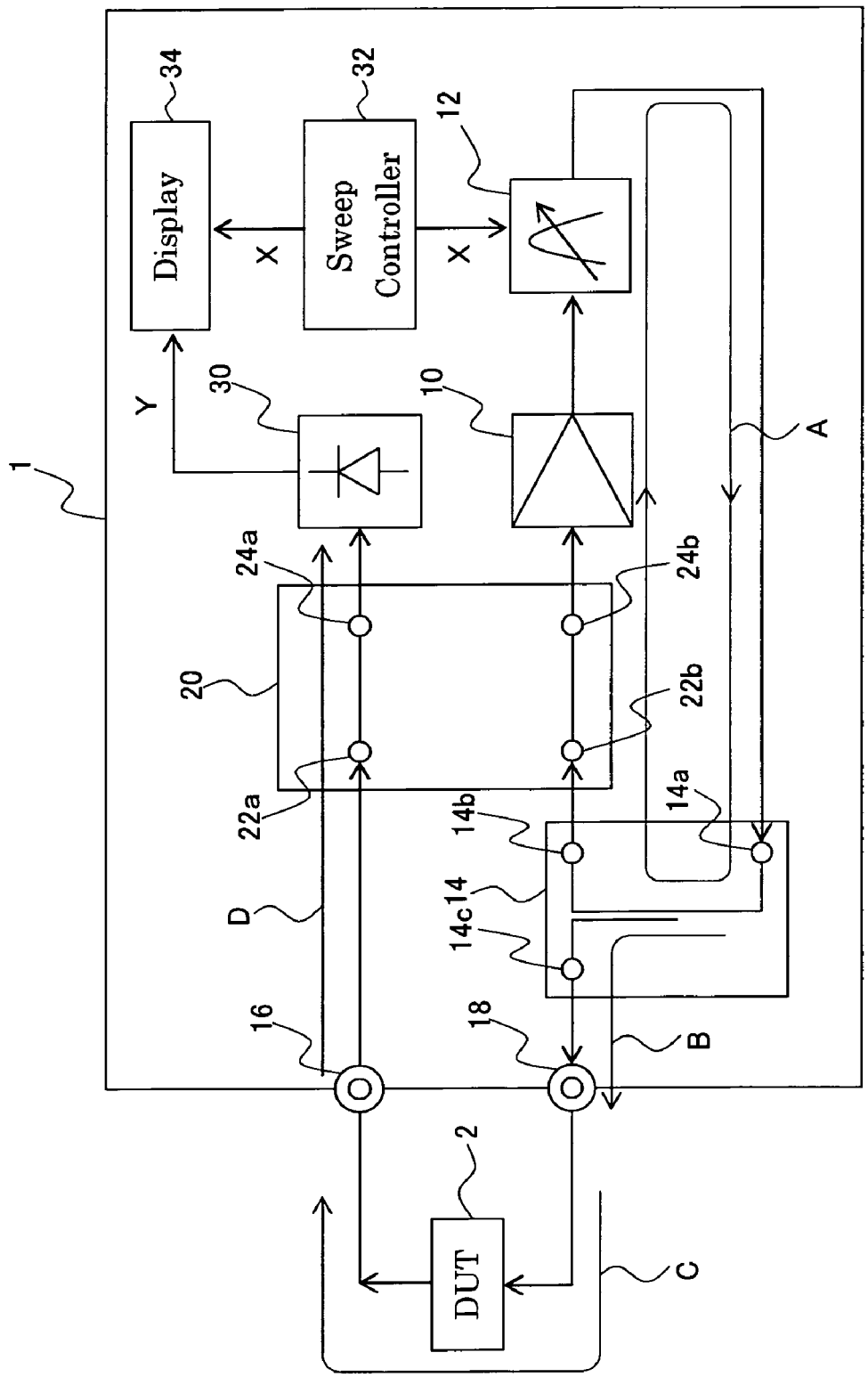
FIG. 2 is a diagram showing an operation upon a photometer 1 according to the first embodiment being used as a wavelength characteristics measuring unit.

First, as shown in FIG. 2, the optical switch 20 is operated to (1) connect between the second input terminal 22b and the second output terminal 24b, and simultaneously between the first input terminal 22a and the first output terminal 24a.

Then, (A) the amplified light output from the optical amplifier 10 is input to the optical amplifier 10 after passing the spectrometer 12, the input terminal 14a and the output terminal 14b of the coupler 14, and the second input terminal 22b and the second output terminal 24b of the optical switch 20. As a result, the amplified light output from the optical amplifier 10 is to be input to the optical amplifier 10, resulting in forming a positive feedback. Due to the positive feedback, an intensity of the amplified light output from the optical amplifier 10 increases. Moreover, the output from the optical amplifier 10 passes the spectrometer 12, and an intensity of the predetermined wavelength band component increases. Furthermore, the predetermined wavelength band is swept by the sweep controller 32, and the light passing the optical amplifier 10 and the spectrometer 12 thus presents a change in the wavelength. If this light is extracted, the positive feedback system including the optical amplifier 10 and the spectrometer 12 can be used as a variable wavelength light source.

Then, (B) the light which passes the optical amplifier 10 and the spectrometer 12 is input to the input terminal 14a of the coupler 14. The light input to the input terminal 14a branches into the output terminals 14b and 14c. The light which has branched into the output terminal 14c passes the optical output terminal 18.

Then, (C) the light which has passed the optical output terminal 18 is made incident on the other end of the DUT 2. The light then transmits through the DUT 2, and emerges from the one end of the DUT 2. The emitted light is received by the optical input terminal 16.

Then, (D) the light received by the optical input terminal 16 passes the first input terminal 22a and the first output terminal 24a of the optical switch 20, and is received by the photodetecting section 30. The photodetecting section 30 converts the received light into the electrical signal.

The display 34 shows the predetermined wavelength band determined by the sweep controller 32 upon the X axis (horizontal axis), and the electric signal output by the photodetecting section 30 upon the Y axis (vertical axis).

From observation of what the display 34 shows, wavelength characteristics of the DUT 2 become apparent. The photometer 1 thus functions as a wavelength characteristics measuring unit which measures the wavelength characteristics of the DUT 2.

Figure 3:
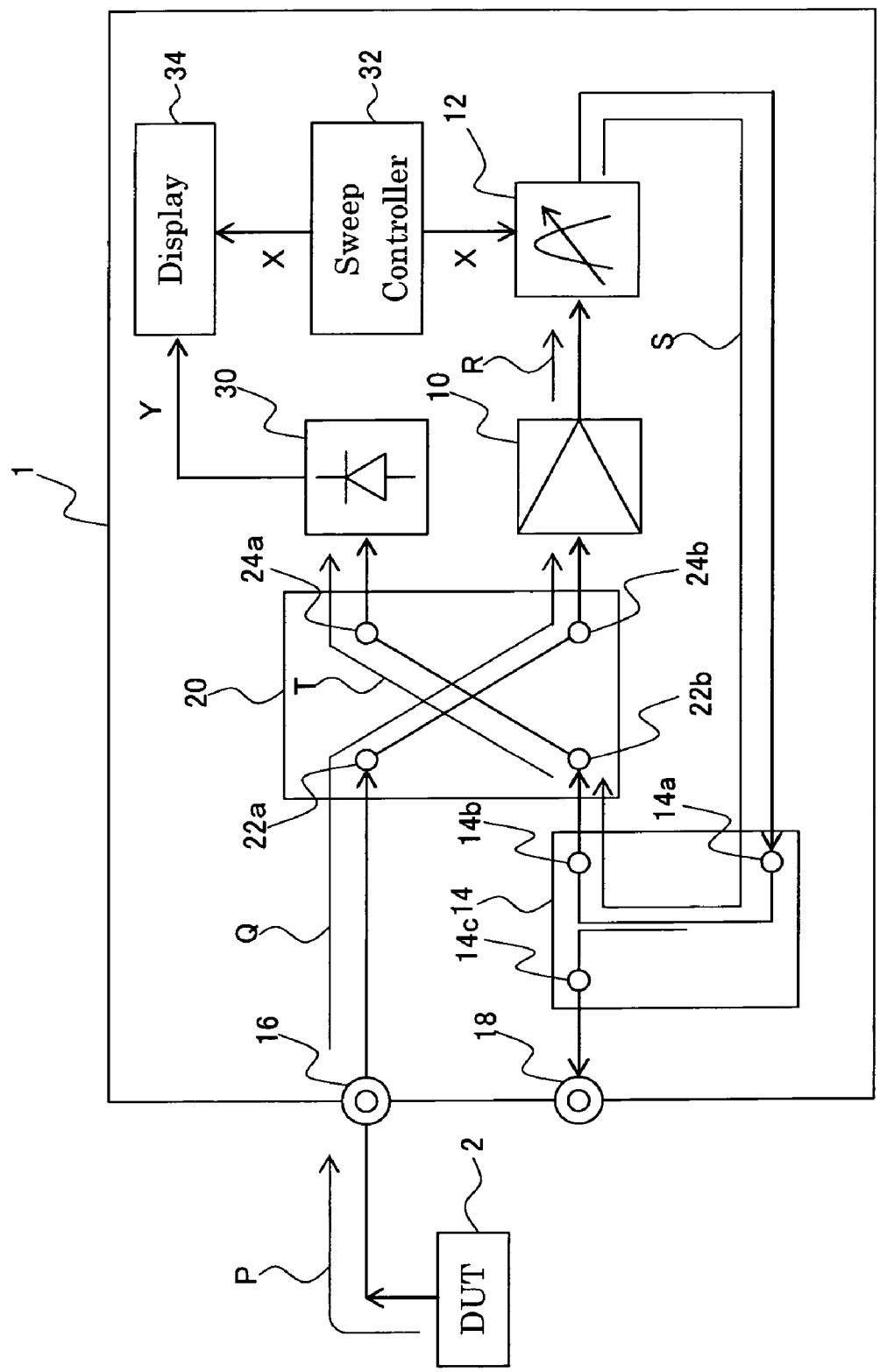
FIG. 3 is a diagram showing an operation upon a photometer 1 according to the first embodiment being used as a spectrum analyzer.

Then, as shown in FIG. 3, the optical switch 20 is operated to (2) connect between the second input terminal 22b and the first output terminal 24a, and simultaneously between the first input terminal 22a and the second output terminal 24b.

Then, (P) the light emitted from the one end of the DUT 2 is received by the optical input terminal 16.

Then, (Q) the light received by the optical input terminal 16 passes the first input terminal 22a and the second output terminal 24b of the optical switch 20, and is input to the optical amplifier 10.

Then, (R) the optical amplifier 10 amplifies the received light, and outputs the light as the amplified light.

Then, (S) the predetermined wavelength band component of the amplified light is extracted by the spectrometer 12. The predetermined wavelength band component which has been extracted passes through the input terminal 14a of the coupler 14, and emerges from the output terminal 14b.

Then, (T) the light emitted from the output terminal 14b passes the second input terminal 22b and the first output terminal 24a of the optical switch 20, and is received by the photodetecting section 30. The photodetecting section 30 converts the received light into the electrical signal.

The display 34 shows the predetermined wavelength band determined by the sweep controller 32 upon the X axis (horizontal axis), and the electric signal output by the photodetecting section 30 upon the Y axis (vertical axis).

From observation of what the display 34 shows, a component of the predetermine wavelength band of the light emitted from the one end of the DUT 2 become apparent. The photometer 1 thus functions as the spectrum analyzer which measures a spectrum of the light emitted from the one end of the DUT 2. Moreover, since the predetermined wavelength band component is extracted from the light amplified by the optical amplifier 10, the optical amplifier 10 functions as a preamplifier. The photometer 1 thus functions as a highly-sensitive spectrum analyzer.

According to the first embodiment, a variable wavelength light source used in a wavelength characteristics measuring unit is constituted by the optical amplifier 10 and the spectrometer 12. On the other hand, as a highly-sensitive spectrum analyzer, the optical amplifier 10 and the spectrometer 12 are used. When the wavelength characteristics measuring unit is used, it is thus possible to use the optical amplifier 10 and the spectrometer 12 of the spectrum analyzer as the variable wavelength light source. When the spectrum analyzer is used, it is thus possible to use the optical amplifier 10 and the spectrometer 12 of the variable wavelength light source of the wavelength characteristics measuring unit. Furthermore, both the wavelength characteristics measuring unit and the spectrum analyzer can use the photodetecting section 30. Both the wavelength characteristics measuring unit and the spectrum analyzer can use the optical amplifier 10, the spectrometer 12, and the photodetecting section 30. It is thus possible to efficiently use the members (optical amplifier 10, spectrometer 12, and photodetecting section 30) of the spectrum analyzer and the wavelength characteristics measuring unit.

Second Embodiment

A second embodiment have the multiple optical amplifiers 10, spectrometers 12, and photodetecting sections 30 according to the first embodiment in order to handle a long wavelength band and a short wavelength band.

Figure 4:
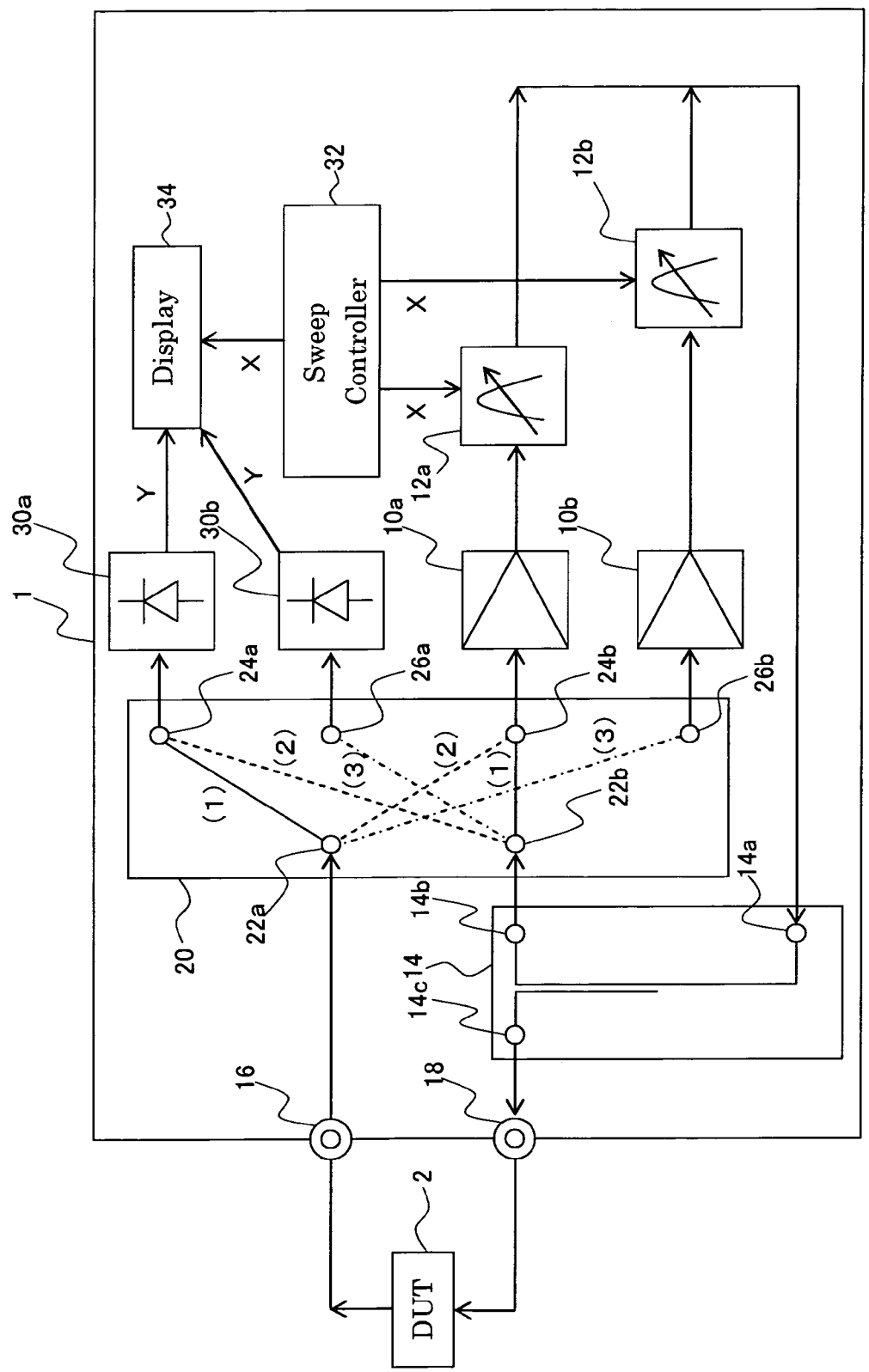
FIG. 4 is a block diagram showing the configuration of the photometer 1 according to the second embodiment of the present invention.

FIG. 4 is a block diagram showing the configuration of the photometer 1 according to the second embodiment of the present invention. The photometer 1 is provided with optical amplifiers (optical amplifying means) 10a and 10b, spectrometers (wavelength-band-component extracting means) 12a and 12b, the coupler (branching means) 14, the optical input terminal 16, the optical output terminal 18, the optical switch (optical connecting means) 20, photodetecting sections 30a and 30b, the sweep controller 32, and the display 34. In the following section, like components are denoted by like numerals as of the first embodiment, and will be explained in no more details.

The optical amplifiers 10a and 10b are similar to the optical amplifier 10 according to the first embodiment. It should be noted that the optical amplifier 10a outputs light within a longer wavelength band compared with the optical amplifier 10b. Thus, the optical amplifier 10a is an optical amplifier for a long wavelength band, and the optical amplifier 10b is an optical amplifier for a short wavelength band.

The spectrometer 12a extracts a component in a predetermined wavelength band from the amplified light output from the optical amplifier 10a. The spectrometer 12b extracts a component in a predetermined wavelength band from the amplified light output from the optical amplifier 10b. It should be noted that the predetermined wavelength band can be changed by the sweep controller 32. Namely, the predetermined wavelength bands can be swept. Moreover, the spectrometer 12a extracts light within the longer wavelength band compared with the spectrometer 12b.

The coupler 14 includes the input terminal 14a, and the output terminals 14b and 14c. The coupler 14 branches light received by the input terminal 14a into the output terminals 14b and 14c. The input terminal 14a receives predetermined wavelength band components output from the spectrometers 12a and 12b. The predetermined wavelength band components are thus output to the output terminals 14b and 14c. The output terminal (first direction side) 14b is connected to the second input terminal 22b of the optical switch 20, and the output terminal (second direction side) 14c is connected to the optical output terminal 18.

The optical input terminal 16 and the optical output terminal 18 are similar to those in the first embodiment, and a description thereof, therefore, is omitted.

The optical switch (optical connecting means) 20 is a DP3T (double ports 3 throws) type switch. The optical switch 20 includes the first input terminal 22a, the second input terminal 22b, the first output terminal 24a, the second output terminal 24b, a third output terminal 26a, and a fourth output terminal 26b.

The first input terminal 22a and the second input terminal 22b are similar to those in the first embodiment, and a description thereof, therefore, is omitted.

The first output terminal 24a and the second output terminal 24b are terminals used to output light. The first output terminal 24a is connected to the photodetecting section 30a. The second output terminal 24b is connected to an input side of the optical amplifier 10a.

The third output terminal 26a and the fourth output terminal 26b are terminals used to output light. The third output terminal 26a is connected to the photodetecting section 30b. The fourth output terminal 26b is connected to an input side of the optical amplifier 10b.

It should be noted that the optical switch 20 carries out any one of (1) connecting between the second input terminal 22b and the second output terminal 24b, and simultaneously between the first input terminal 22a and the first output terminal 24a, (2) connecting between the second input terminal 22b and the first output terminal 24a, and simultaneously between the first input terminal 22a and the second output terminal 24b, and (3) connecting between the second input terminal 22b and the third output terminal 26a, and simultaneously between the first input terminal 22a and the fourth output terminal 26b.

If the second input terminal 22b and the second output terminal 24b are connected with each other, the output terminal 14b of the coupler 14 and the input side of the optical amplifier 10a are to be connected with each other. If the first input terminal 22a and the first output terminal 24a are connected with each other, the one end of the DUT 2 and the photodetecting section 30a are to be connected with each other.

Moreover, if the second input terminal 22b and the first output terminal 24a are connected with each other, the output terminal 14b of the coupler 14 and the photodetecting section 30a are to be connected with each other. If the first input terminal 22a and the second output terminal 24b are connected with each other, the one end of the DUT 2 and the input side of the optical amplifier 10a are to be connected with each other.

Furthermore, if the second input terminal 22b and the third output terminal 26a are connected with each other, the output terminal 14b of the coupler 14 and the photodetecting section 30b are to be connected with each other. If the first input terminal 22a and the fourth output terminal 26b are connected with each other, the one end of the DUT 2 and the input side of the optical amplifier 10b are to be connected with each other.

The photodetecting section 30a detects the light received from the first output terminal 24a. Specifically, the photodetecting section 30a converts the received light into an electrical signal. The photodetecting section 30b detects the light received from the second output terminal 24b. Specifically, the photodetecting section 30b converts the received light into an electrical signal. It should be noted that a wavelength band of the light detected by the photodetecting section 30a corresponds to the wavelength band of the light output from the optical amplifier 10a (long wavelength band). Moreover, a wavelength band of the light detected by the photodetecting section 30b corresponds to the wavelength band of the light output from the optical amplifier 10b (short wavelength band). For example, the photodetecting section 30a is an InGaAs photodiode, and the photodetecting section 30b is a Si photodiode.

The sweep controller 32 sweeps the predetermined wavelength bands of the spectrometers 12a and 12b. It should be noted that the predetermined wavelength bands are also transmitted to the display 34.

The display 34 shows the predetermined wavelength bands determined by the sweep controller 32 upon the X axis (horizontal axis), and the electric signals output by the photodetecting sections 30a and 30b upon the Y axis (vertical axis).

A description will now be given of an operation of the photometer 1 according to the second embodiment with reference to FIGS. 5, 6, and 7.

Figure 5:
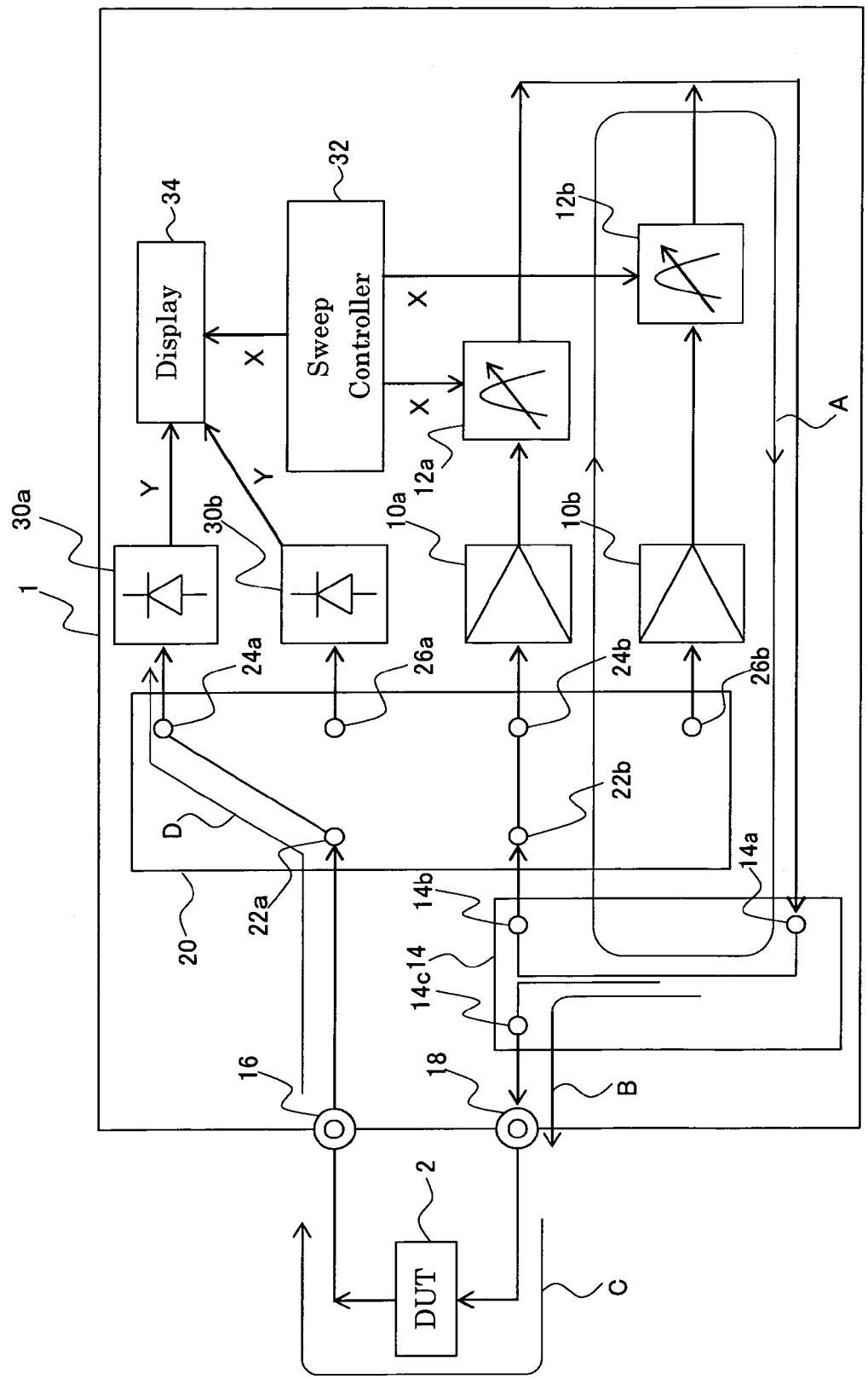
FIG. 5 is a diagram showing an operation upon a photometer 1 according to the second embodiment being used as a wavelength characteristics measuring unit.

First, as shown in FIG. 5, the optical switch 20 is operated to (1) connect between the second input terminal 22b and the second output terminal 24b, and simultaneously between the first input terminal 22a and the first output terminal 24a.

Then, (A) the amplified light output from the optical amplifier 10a is input to the optical amplifier 10a after passing the spectrometer 12a, the input terminal 14a and the output terminal 14b of the coupler 14, and the second input terminal 22b and the second output terminal 24b of the optical switch 20. As a result, the amplified light output from the optical amplifier 10a is to be input to the optical amplifier 10a, resulting in a positive feedback. Due to the positive feedback, an intensity of the amplified light output from the optical amplifier 10a increases. Moreover, the output from the optical amplifier 10a passes the spectrometer 12a, and an intensity of the predetermined wavelength band component increases. Furthermore, the predetermined wavelength band is swept by the sweep controller 32, and the light passing the optical amplifier 10a and the spectrometer 12a presents a change in the wavelength. If this light is extracted, the positive feedback system including the optical amplifier 10a and the spectrometer 12a can be used as a variable wavelength light source.

Then, (B) the light which passes the optical amplifier 10a and the spectrometer 12a is input to the input terminal 14a of the coupler 14. The light input to the input terminal 14a branches into the output terminals 14b and 14c. The light which has branched into the output terminal 14c passes the optical output terminal 18.

Then, (C) the light which has passed the optical output terminal 18 is made incident on the other end of the DUT 2. The light beam then transmits through the DUT 2, and emerges from the one end of the DUT 2. The emitted light is received by the optical input terminal 16.

Then, (D) the light received by the optical input terminal 16 passes the first input terminal 22a and the first output terminal 24a of the optical switch 20, and is received by the photodetecting section 30a. The photodetecting section 30a converts the received light into the electrical signal.

The display 34 shows the predetermined wavelength bands determined by the sweep controller 32 upon the X axis (horizontal axis), and the electric signals output by the photodetecting sections 30a and 30b upon the Y axis (vertical axis).

From observation of what the display 34 shows, the wavelength characteristics of the DUT 2 become apparent. The photometer 1 thus functions as a wavelength characteristics measuring unit which measures the wavelength characteristics of the DUT 2.

Figure 6:
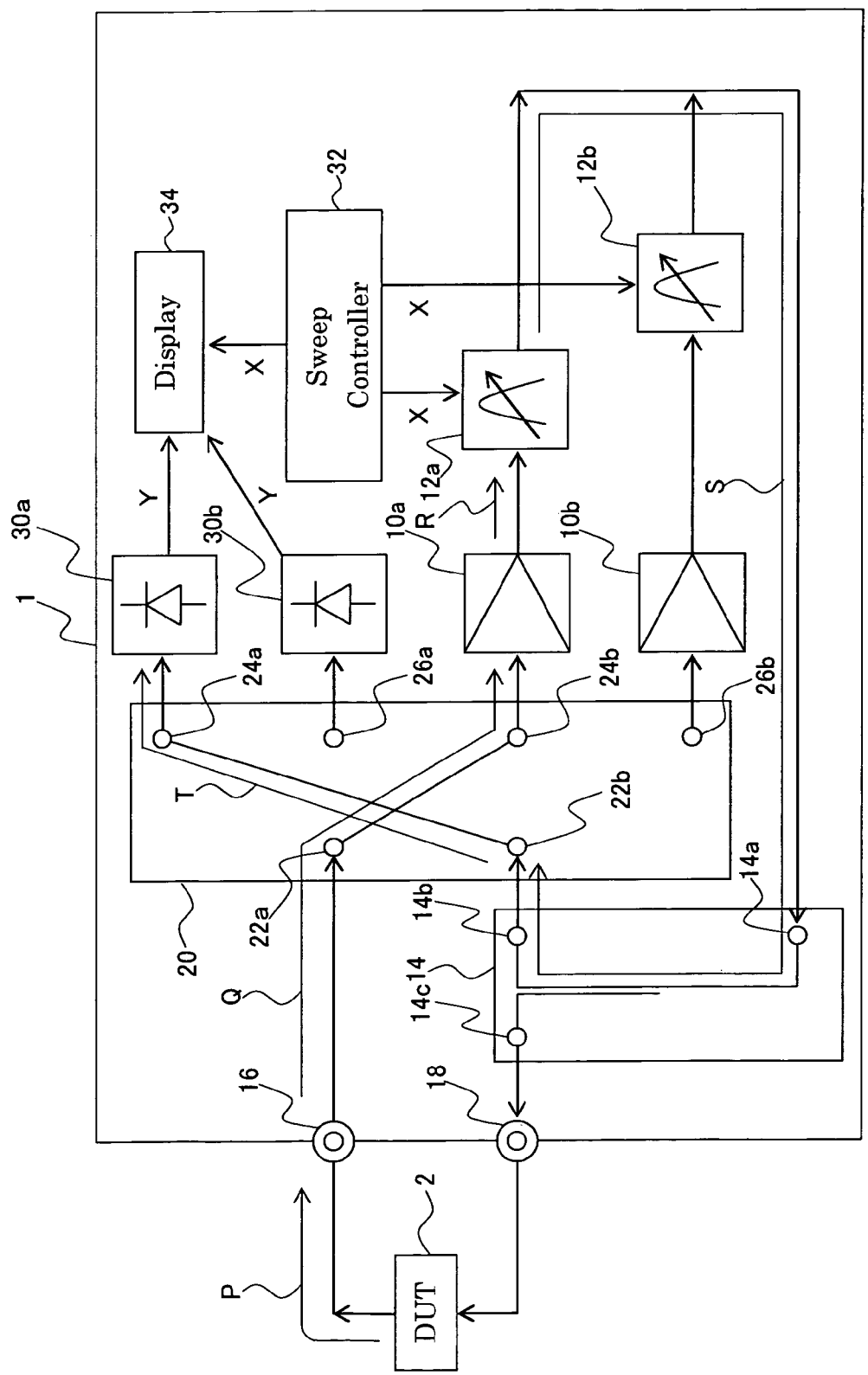
FIG. 6 is a diagram showing an operation upon a photometer 1 according to the second embodiment being used as a spectrum analyzer (for a long wavelength band)

Then, as shown in FIG. 6, the optical switch 20 is operated to (2) connect between the second input terminal 22b and the first output terminal 24a, and simultaneously between the first input terminal 22a and the second output terminal 24b.

Then, (P) the light emitted from the one end of the DUT 2 is received by the optical input terminal 16.

Then, (Q) the light received by the optical input terminal 16 passes the first input terminal 22a and the second output terminal 24b of the optical switch 20, and is input to the optical amplifier 10a.

Then, (R) the optical amplifier 10a amplifies the received light, and outputs the light as the amplified light.

Then, (S) the predetermined wavelength band component of the amplified light is extracted by the spectrometer 12a. The predetermined wavelength band component which has been extracted passes through the input terminal 14a of the coupler 14, and emerges from the output terminal 14b.

Then, (T) the light emitted from the output terminal 14b passes the second input terminal 22b and the first output terminal 24a of the optical switch 20, and is received by the photodetecting section 30a. The photodetecting section 30a converts the received light into the electrical signal.

The display 34 shows the predetermined wavelength bands determined by the sweep controller 32 upon the X axis (horizontal axis), and the electric signals output by the photodetecting sections 30a and 30b upon the Y axis (vertical axis).

From observation of what the display 34 shows, a component of the long wavelength band of the light emitted from the one end of the DUT 2 become apparent.

Figure 7:
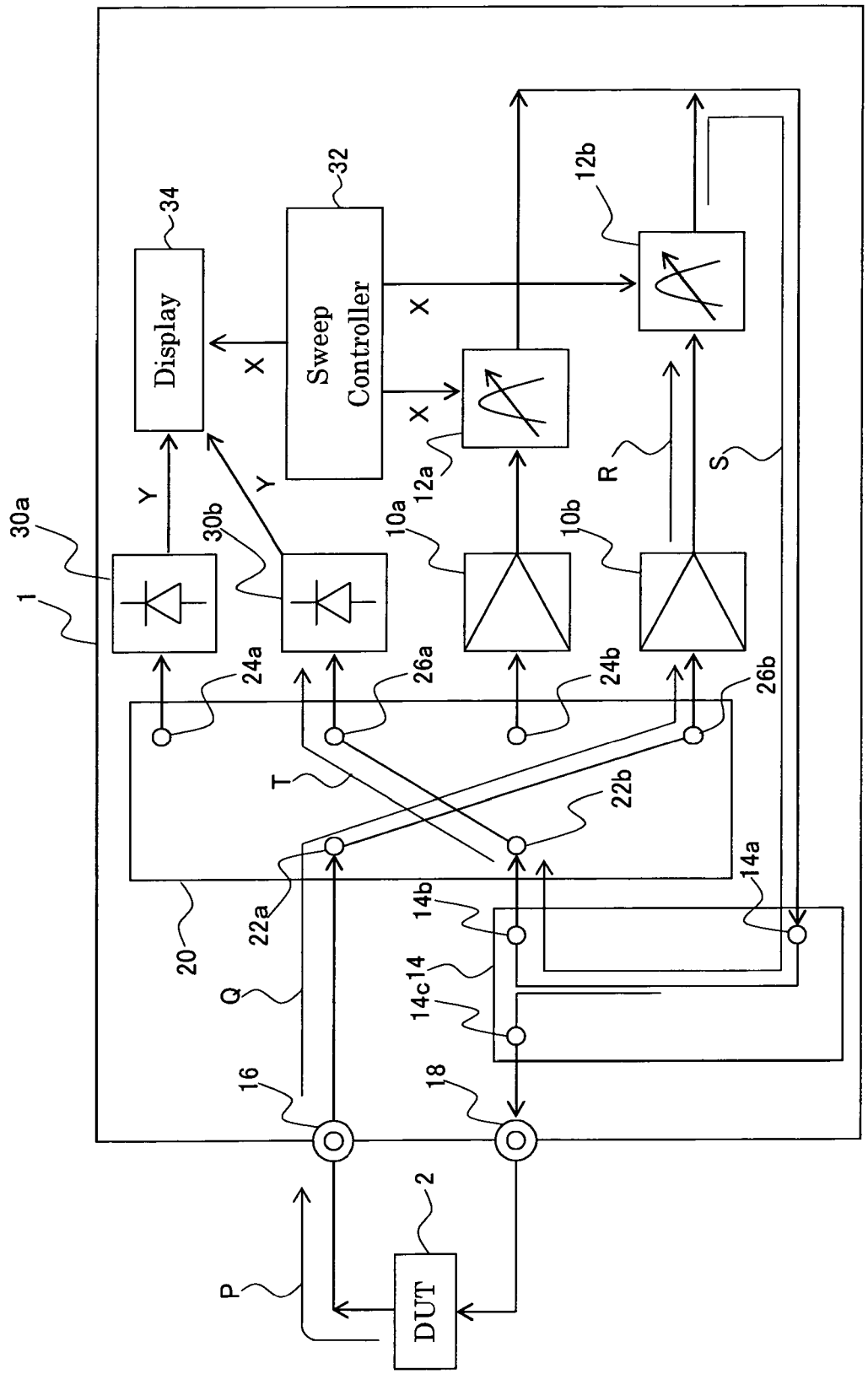
FIG. 7 is a diagram showing an operation upon a photometer 1 according to the second embodiment being used as a spectrum analyzer (for a short wavelength band).

Then, as shown in FIG. 7, the optical switch 20 is operated to (3) connect between the second input terminal 22b and the third output terminal 26a, and simultaneously between the first input terminal 22a and the fourth output terminal 26b.

Then, (P) the light emitted from the one end of the DUT 2 is received by the optical input terminal 16.

Then, (Q) the light received by the optical input terminal 16 passes the first input terminal 22a and the fourth output terminal 26b of the optical switch 20, and is input to the optical amplifier 10b.

Then, (R) the optical amplifier 10b amplifies the received light, and outputs the light as the amplified light.

Then, (S) the predetermined wavelength band component of the amplified light is extracted by the spectrometer 12b. The predetermined wavelength band component which has been extracted passes through the input terminal 14a of the coupler 14, and emerges from the output terminal 14b.

Then, (T) the light emitted from the output terminal 14b passes the second input terminal 22b and the third output terminal 26a of the optical switch 20, and is received by the photodetecting section 30b. The photodetecting section 30b converts the received light into the electrical signal.

The display 34 shows the predetermined wavelength bands determined by the sweep controller 32 upon the X axis (horizontal axis), and the electric signals output by the photodetecting sections 30a and 30b upon the Y axis (vertical axis).

From observation of what the display 34 shows, a component of the short wavelength band of the light emitted from the one end of the DUT 2 become apparent.

The photometer 1 thus functions as the spectrum analyzer which measures a spectrum of the light emitted from the one end of the DUT 2 (refer to FIGS. 6 and 7). Moreover, since the predetermined wavelength band components are respectively extracted from the light respectively amplified by the optical amplifiers 10a and 10b, the optical amplifiers 10a and 10b function as preamplifiers. The photometer 1 thus functions as a highly-sensitive spectrum analyzer.

According to the second embodiment, there are obtained effects as in the first embodiment. Moreover, when the photometer 1 is used as a spectrum analyzer, the photodetecting section 30a handles the long wavelength band, the photodetecting section 30b handles the short wavelength band, and it is thus possible to detect components in the wider wavelength band compared with the first embodiment.

The invention claimed is:

1. A photometer, comprising:
a wavelength-band-component extractor that extracts a component of a predetermined wavelength band from incident light;
a brancher that branches the predetermined wavelength band component into a first direction and a second direction;
an optical connector that comprises a first input terminal, a second input terminal, a first output terminal, and a second output terminal, said first input terminal being connected to one end of an device under test, and said second input terminal being connected to a side in the first direction of said brancher;
an optical amplifier that receives light from said second output terminal, and outputs amplified light, which is obtained by amplifying the light, to an incident light receiving section of said wavelength-band-component extractor; and
a photodetector that is connected to said first output terminal, and detects light, wherein:
the other end of the device under test is connected to a side in the second direction of said brancher; and
said optical connector (1) connects between said first input terminal and said first output terminal, and between said second input terminal and said second output terminal, or (2) connects between said first input terminal and said second output terminal, and between said second input terminal and said first output terminal.

2. The photometer according to claim 1, wherein said optical amplifier is a fiber amplifier or a semiconductor optical amplifier.

3. The photometer according to claim 1, wherein said predetermined wavelength band of said wavelength-band-component extractor is variable.

4. The photometer according to claim 1, wherein the device under test is an optical fiber or a device which transmits light beam.

5. The photometer according to claim 1, wherein:
there exist a plurality of wavelength-band-component extractors respectively having a predetermined wavelength band to be extracted differing from each other; and
there exist a plurality of photodetectors respectively having a wavelength band of light to be detected corresponding to the predetermined wavelength band.

6. A photometer comprising:
a spectrometer that extracts a component of a predetermined wavelength band from incident light;
a coupler that branches the predetermined wavelength band component into a first direction and a second direction;
an optical switch that comprises a first input terminal, a second input terminal, a first output terminal, and a second output terminal, said first input terminal being connected to one end of an device under test, and said second input terminal being connected to a side in the first direction of said coupler;
an optical amplifier that receives light from said second output terminal, and outputs amplified light, which is obtained by amplifying the light, to an incident light receiving section of said spectrometer; and
a photodetector that is connected to said first output terminal, and detects light, wherein:
the other end of the device under test is connected to a side in the second direction of said coupler; and said optical switch (1) connects between said first input terminal and said first output terminal, and between said second input terminal and said second output terminal, or (2) connects between said first input terminal and said second output terminal, and between said second input terminal and said first output terminal.

7. The photometer according to claim 6, wherein said optical amplifier is a fiber amplifier or a semiconductor optical amplifier.

8. The photometer according to claim 6, wherein said predetermined wavelength band of said spectrometer is variable.

9. The photometer according to claim 6, wherein the device under test is an optical fiber or a device which transmits a light beam.

10. The photometer according to claim 6, wherein:

there exist a plurality of said spectrometers respectively having a predetermined wavelength band to be extracted differing from each other; and there exist a plurality of said photodetectors respectively having a wavelength band of light to be detected corresponding to the predetermined wavelength band.

* * * * *